United States Patent [19]
Arendt et al.

[11] Patent Number: 6,003,075
[45] Date of Patent: Dec. 14, 1999

[54] ENQUEUING A CONFIGURATION CHANGE IN A NETWORK CLUSTER AND RESTORE A PRIOR CONFIGURATION IN A BACK UP STORAGE IN REVERSE SEQUENCE ORDERED

[75] Inventors: James W. Arendt, Round Rock; Ching-Yun Chao, Austin; Michael David Kistler, Pflugerville; Frank Daniel Lawlor, Austin; Rodolfo Augusto Mancisidor, Austin; Jayashree Ramanathan, Round Rock, all of Tex.; Hovey Raymond Strong, San Jose, Calif.

[73] Assignee: International Business Machines Corporation, Armonk, N.Y.

[21] Appl. No.: 08/888,550

[22] Filed: Jul. 7, 1997

[51] Int. Cl.[6] .............. H01J 13/00; G06F 9/445
[52] U.S. Cl. .............. 709/221; 709/220; 713/100; 395/712
[58] Field of Search .............. 395/200.51, 200.47, 395/651–653, 712

[56] References Cited

U.S. PATENT DOCUMENTS

| | | | |
|---|---|---|---|
| 4,958,273 | 9/1990 | Anderson et al. | 364/200 |
| 5,598,549 | 1/1997 | Rathunde | 395/441 |
| 5,612,865 | 3/1997 | Dasgupta | 364/184 |
| 5,666,486 | 9/1997 | Alfieri et al. | 395/200.47 |

*Primary Examiner*—Glenn A. Auve
*Assistant Examiner*—Tim Vo
*Attorney, Agent, or Firm*—Jeffrey S. Labaw; Daniel E. Venglarik; Andrew J. Dillon

[57] ABSTRACT

Configuration changes are dynamically applied to a cluster multiprocessing system by enqueuing a configuration change event. When the configuration change event is processed, the prior configuration is backed up and each software component applies a relevant portion of a configuration change transaction in an ordered, synchronized manner. Each software component applies its portion of the transaction either by reinitialization or a logged transition operation. If the configuration change transaction fails, the software components roll back the portions, of the configuration change already applied in an ordered, synchronized manner to restore the prior configuration. Multiple events for different configuration changes may be enqueued.

20 Claims, 4 Drawing Sheets

ENQUEUING A CONFIGURATION CHANGE IN A NETWORK CLUSTER AND RESTORE A PRIOR CONFIGURATION IN A BACK UP STORAGE IN REVERSE SEQUENCE ORDERED

BACKGROUND OF THE INVENTION

1. Technical Field

The present invention relates in general to cluster multiprocessing systems and in particular to dynamic reconfiguration of cluster multiprocessing systems. Still more particularly, the present invention relates to dynamic reconfiguration of highly available cluster multiprocessing systems.

2. Description of the Related Art

High availability (HA) is gaining widespread commercial acceptance as an alternative to fault tolerance for mission-critical computing platforms. Fault tolerant data processing systems rely on specialized hardware to detect hardware faults and switch to a redundant hardware component, regardless of whether the component is a processor, memory board, hard disk drive, adapter, power supply, etc. While providing seamless cutover and uninterrupted performance, fault tolerant systems are expensive due to the redundant hardware requirement. Additionally, fault tolerant systems do not address software errors, a more common source of data processing system failure.

High availability utilizes standard hardware, but provides software allowing resources to be shared system wide. When a node, component, or application fails, an alternative path to the desired resource is quickly established. The brief interruption required to reestablish availability of the resource is acceptable in many situations. The hardware costs are significantly less than fault tolerant systems, and backup facilities may be utilized during normal operation.

Highly available systems are often implemented as clustered multiprocessor (CMP) systems. A cluster includes a plurality of nodes or processors connected to shared resources, such as shared external hard disks. Typically, each node runs a server or "back end" application permitting access to the shared resources. A node may "own" a set of resources—disks, volume groups, file systems, networks, networks addresses and/or applications—as long as that node is available. When that node goes down, access to the resources is provided through a different node.

An active configuration comprises a set of hardware and software entities together with a set of relationships among these entities, the combination of entities and relationships delivering services to users. Hardware entities specify nodes, adapters, shared disks, etc. while software entities specify failover and reintegration policies. For example, a particular software entity may specify that an application server should failover to node B when node A fails. It may also specify whether the application server should fail back to node A when node A reintegrates.

Within clustered multiprocessing systems, it would be advantageous to be able to dynamically reconfigure an active cluster, changing the cluster configuration without having to stop and then restart cluster services. Dynamic change of an active configuration preferably changes the entity and relationship sets while the system is running, with as little disruption of service as possible. Such dynamic configuration changes are required when the cluster is serving mission-critical applications that cannot be brought down for long periods of time (and preferably are not brought down at all).

An example of a situation requiring persistent support for dynamic configuration changes is performing a hardware upgrade within a four node cluster (nodes A, B, C and D). A user may need to bring down the node to be upgraded, such as node D, upgrade the hardware, rejoin node D to the cluster, and possibly make configuration changes. If node D were equipped with a faster processor and/or additional memory, for instance, the user may wish node D to become the primary system for an application server previously run on a different node. The user will desire to make these changes and will want the changes to be preserved across power outages and cluster reboots.

Another example of a situation requiring dynamic configuration changes involves transient dynamic configuration changes. If the workload of a node temporarily increases, the user may wish to move an application server previously run on that system to another node. Since the increased workload is not normal, the change need not be preserved across cluster reboots.

At least one prior art cluster software package—HACMP for AIX®, available from International Business Machines Corporation of Armonk, N.Y.—provides some dynamic reconfiguration capabilities. Each node includes a default configuration which is copied into the active configuration for the respective node at cluster start-up. The default configuration may be modified while the cluster is active and copied into the default configurations of other nodes. This modified default configuration is then copied into a staging configuration in each active node. The new configuration is verified and, when the daemons for each cluster node are refreshed, copied into the active configuration for active nodes. Cluster services for an inactive nodes added by the reconfiguration may then be started.

The prior art system for dynamic reconfiguration has several limitations. First, multiple reconfigurations cannot be synchronized. When a second reconfiguration is initiated while a dynamic reconfiguration is in progress, the presence of a staging configuration on any cluster node acts as a lock preventing initiation of a new dynamic reconfiguration event.

Second, the prior art system cannot be utilized to effect dynamic changes when multiple software components are involved in applying different parts of the changes to the configuration. Where a dynamic configuration change involving multiple software components fails, the changes already performed up to the point of failure must be rolled back. This is much more complex than dynamically changing only a single component, and reverting to an old configuration if the attempted configuration change fails. Thus, the changes which may be made dynamically are limited.

It would be desirable, therefore, to provide an cluster multiprocessing system with support for dynamic changes involving multiple software components, and for synchronizing multiple dynamic reconfigurations. It would further be desirable to coordinate dynamic configuration changes with other events in a system and to make the dynamic changes in a fail safe manner.

SUMMARY OF THE INVENTION

It is therefore one object of the present invention to provide an improved cluster multiprocessing system.

It is another object of the present invention to provide an improved method of dynamic reconfiguration of cluster multiprocessing systems.

It is yet another object of the present invention to provide dynamic reconfiguration of highly available cluster multiprocessing systems synchronized across multiple software components.

The foregoing objects are achieved as is now described. Configuration changes are dynamically applied to a cluster multiprocessing system by enqueuing a configuration change event. When the configuration change event is processed, the prior configuration is backed up and each software component applies a relevant portion of a configuration change transaction in an ordered, synchronized manner. Each software component applies its portion of the transaction either by reinitialization or a logged transition operation. If the configuration change transaction fails, the software components roll back the portions of the configuration change already applied in an ordered, synchronized manner to restore the prior configuration. Multiple events for different configuration changes may be enqueued.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
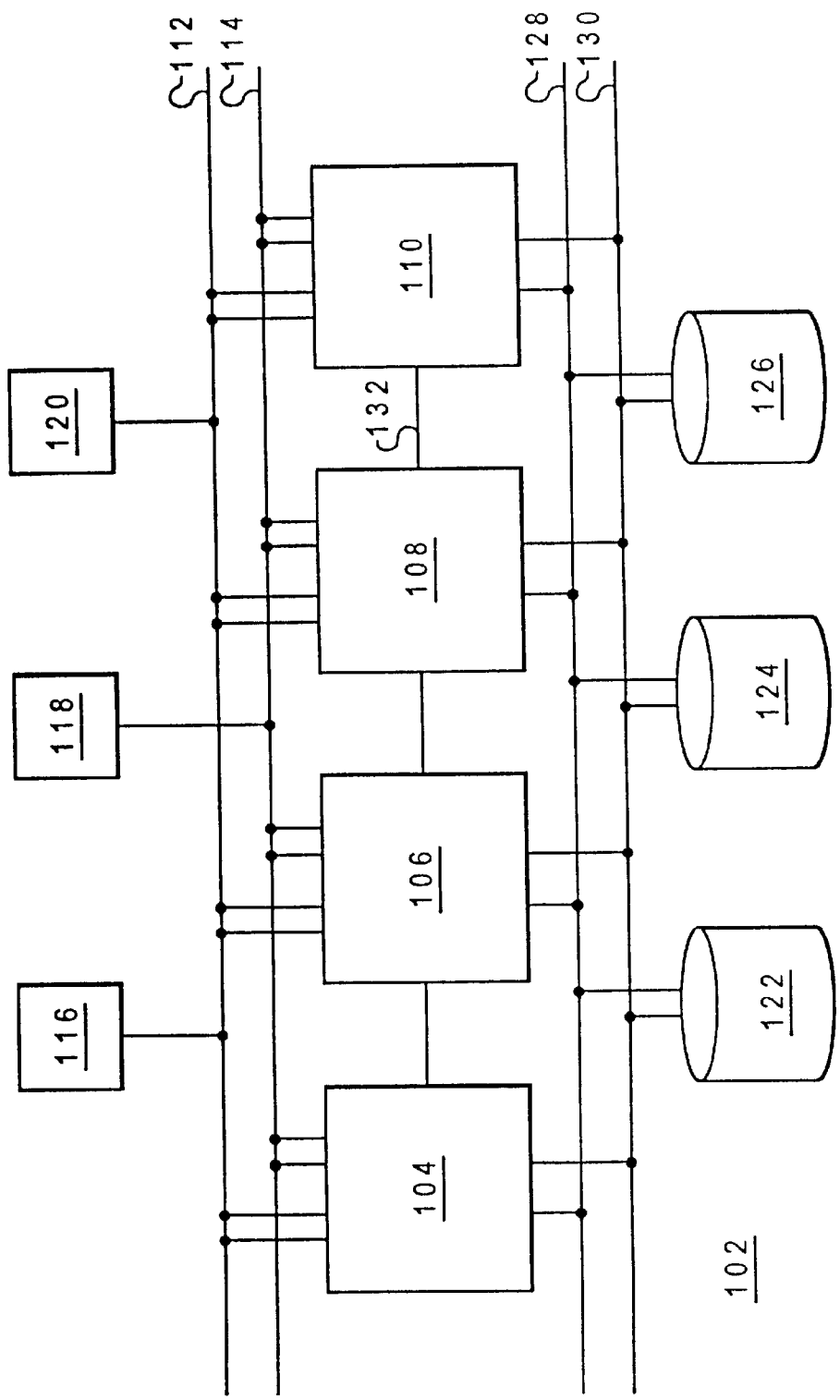
FIG. 1 depicts a diagram of a cluster multiprocessing system in which a preferred embodiment of the present invention may be implemented.

With reference now to the figures, and in particular with reference to FIG. 1, a diagram of a cluster multiprocessing system in which a preferred embodiment of the present invention may be implemented is depicted. System 102 includes a plurality of server nodes 104–110, each typically identified by a unique name. Each node 104–110 may be a symmetric multiprocessor (SMP) data processing system such as a RISC System/6000® system available from International Business Machines Corporation of Armonk, N.Y. or a data processing system functioning as a Windows NT™ server.

Each node 104–110 within system 102 includes an operating system, such as the Advanced interactive Executive (AIX®) operating system available from International Business Machines Corporation of Armonk, N.Y. or the Windows NT™ operating system available from Microsoft Corporation of Redmond, Wash. Nodes 104–110 within system 102 also include high availability cluster software capable of running on top of or in conjunction with the operating system. This high availability cluster software will include the features described below.

Nodes 104–110 are connected to public local area networks 112–114, which may be an Ethernet, Token-Ring, fiber distributed data interface (FDDI), or other network. Public networks 112–114 provide clients 116–120 with access to servers 104–110. Clients 116–120 are data processing systems which may access nodes 104–110, each running a "front end" or client application which queries server applications running on nodes 104–110.

Typically, each node 104–110 runs server or "back end" applications which access data on shared external disks 122–126 via disk buses 128–130. Nodes 104–110 may also be connected by an additional network 132 or networks. For example, a private network may provide point-to-point connection between nodes 104–110 within system 102, with no access provided to clients 116–120. The private network, if available, may be utilized for lock traffic, and may be an Ethernet, Token-Ring, FDDI, or serial optical channel connector (SOCC) network. A serial network may also provide point-to-point communication between nodes 104–110, used for control messages and heartbeat traffic in the event that an alternative subsystem fails.

As depicted in the exemplary embodiment, system 102 may include some level of redundancy to eliminate single points of failure. For example, each node 104–110 may be connected to each public network 112–114 by two network adapters: a service adapter providing the primary active connection between a node and network and a standby adapter which substitutes for the service adapter in the event that the service adapter fails. Thus, when a resource within system 102 becomes unavailable, alternative resources may be quickly substituted for the failed resource.

Those of ordinary skill in the art will appreciate that the hardware depicted in the exemplary embodiment of FIG. 1 may vary. For example, a system may include more or fewer nodes, additional clients, and/or other connections not shown. Additionally, the present invention may be implemented within any software which utilizes configuration data and needs to support dynamic changes in such data. Systems providing high availability are merely employed for the purposes of illustrating and explaining the invention.

Figure 2:
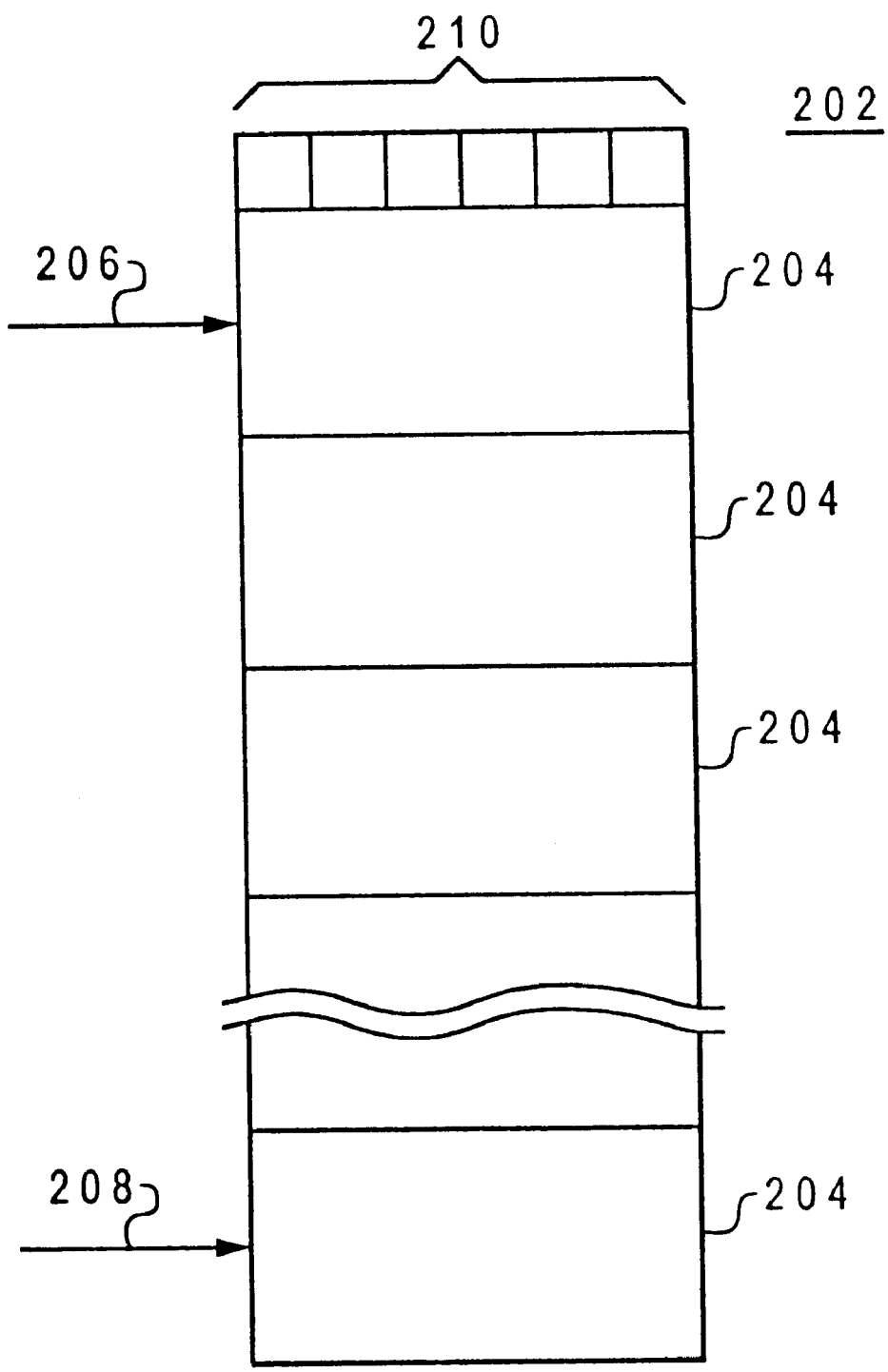
FIG. 2 is a queue structure which may be employed by a process for dynamically reconfiguring a highly available clustered multiprocessing system involving multiple software components in accordance with a preferred embodiment of the present invention.

Referring to FIG. 2, a queue structure which may be employed by a process for dynamically reconfiguring a highly available clustered multiprocessing system involving multiple software components in accordance with a preferred embodiment of the present invention is illustrated. Coordination in processing events—typically failure (or "failover") events and recovery (or "reintegration") events—related to highly available resources is required. Such coordination is provided by a replicated event queue. The event queue in the exemplary embodiment is a replicated event queue maintained by a coordination component of the high availability cluster software. The coordination component is a distributed entity having a daemon running on each node within the cluster. The coordination component subscribes to other components of the high availability cluster software such as a component for handling node and adapter failures, a component for handling forced failovers by a system administrator, and/or a component for handling application server failures. The coordination component is notified by other components of events which have occurred through an API, collects the events, and determines which of the events should be enqueued for processing. The coordination component may also remove events from the queue under appropriate circumstances.

Events within the queue are processed utilizing information contained within a cluster configuration, and often comprise multiple phases separated by barriers. The phases are generally distributed actions resulting from statements executed in parallel on different nodes within the cluster. Optional barriers between statements allow the one statement to be completed on all nodes within the cluster before a subsequent statement is begun on any node within the cluster. For example, if an application server is to be changed to a different node, every node in the cluster must stop utilizing the application server on the current node before the application server is restarted on the new node.

Failure to coordinate dynamic configuration changes with event processing may result in different configuration information being utilized in various phases of processing a given event, resulting in inconsistent or incorrect behavior.

The expandable queue structure 202 depicted includes a plurality of queue entries 204 together with a pointer 206 to a first queue entry and a pointer 208 to a last queue entry. Queue structure 202 also includes flags 210, which may be employed in dynamically reconfiguring a highly available data processing system involving multiple software components. Each queue entry 204 may include an event name (such as "node_up") and a priority. Priority classes may be employed, such that all events relating to nodes are assigned a first priority while all events relating to adapters are assigned a second priority and all events relating to application servers are assigned a third priority. Each queue entry 204 may also include a node identification, a time stamp, pointers to the next queue entry and the previous queue entry, an event type (i.e., internally generated or externally generated), and parameters for processing the event.

Figure 3A:
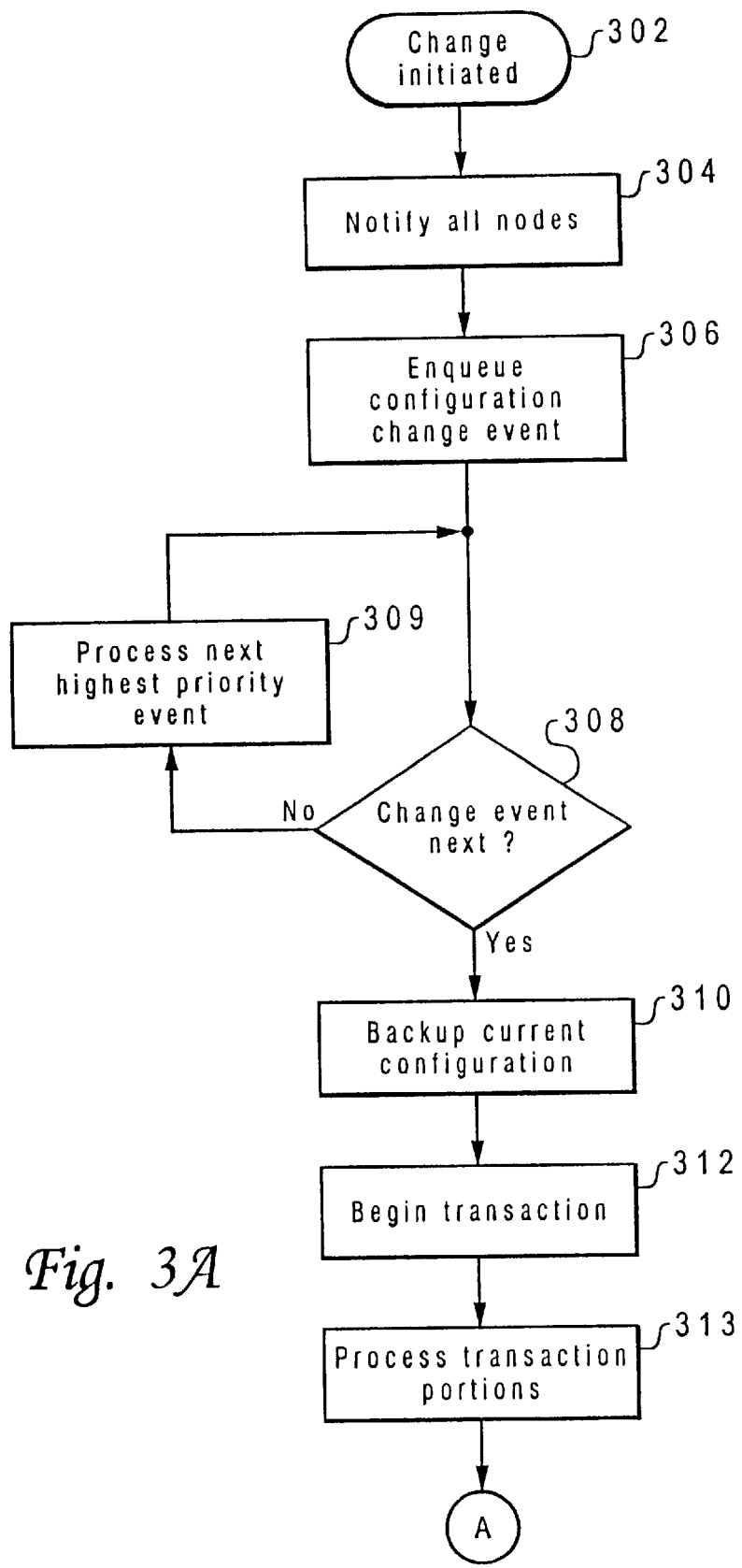
FIGS. 3A–3B depict a high level flowchart for a process of dynamically reconfiguring a highly available clustered multiprocessing system involving multiple software components in accordance with a preferred embodiment of the present inventions.
Figure 3B:
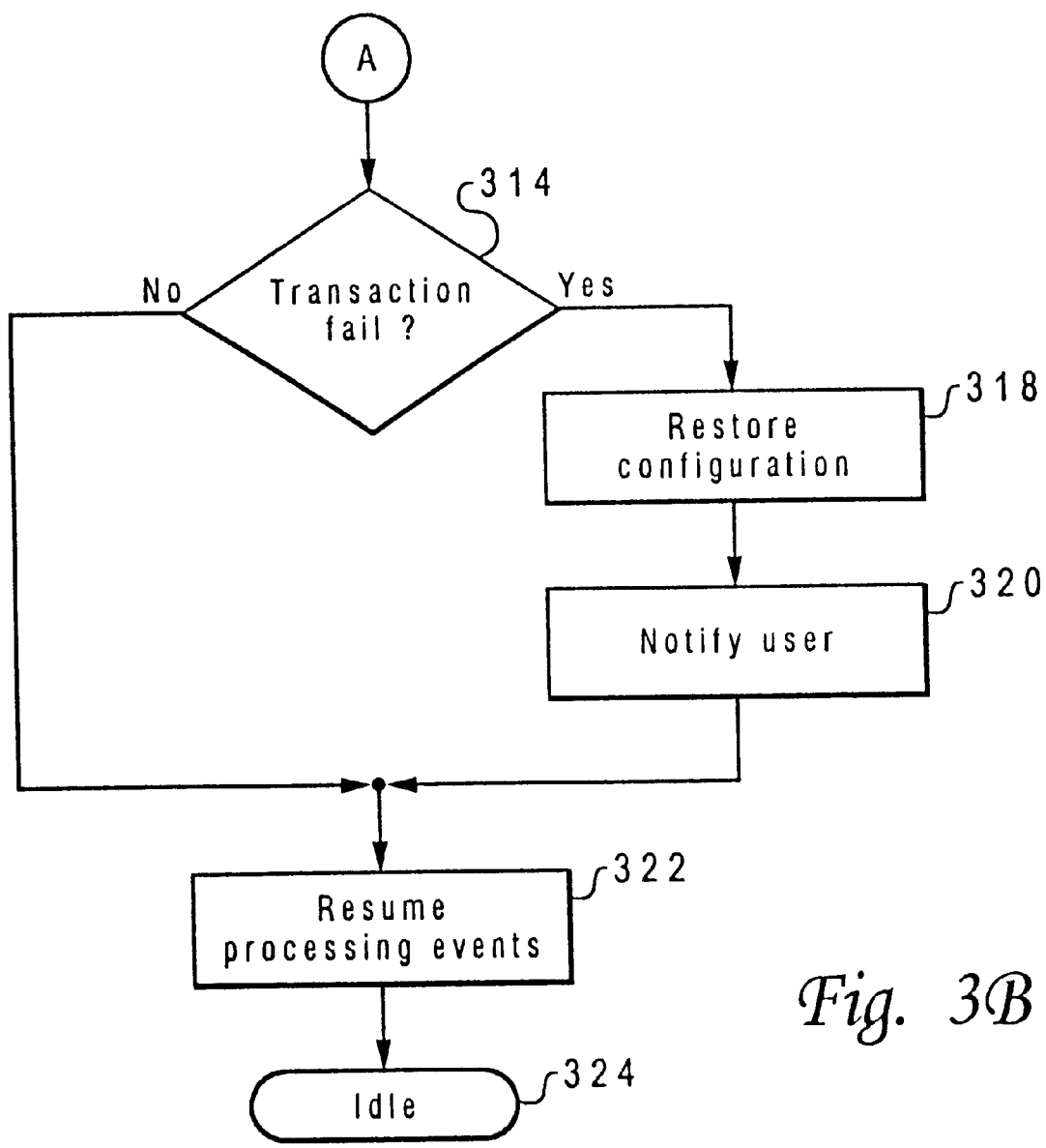

With reference now to FIGS. 3A and 3B, a high level flowchart for a process of dynamically reconfiguring a highly available clustered multiprocessing system involving multiple software components in accordance with a preferred embodiment of the present invention is depicted. The process is employed by a configuration component of highly available cluster software.

The process depicted begins at step 302, which depicts initiation of a dynamic configuration change by the user. For example, the user may alter the primary node for a specific application server or temporarily change the primary and standby nodes for all application servers for a given node in order to bring that node down. The process then passes to step 304, which illustrates notifying all nodes within the system that a configuration change event has been initiated. The notification may be performed by setting a flag associated with the event queue.

The process then passes to step 306, which depicts placing a configuration change event in the replicated event queue. In the exemplary embodiment, the replicated event queue is the same queue utilized for failure and recovery events. A separate event queue may be utilized for configuration change events, but would still require coordination with the existing event queue.

The queue may already contain other events already being processed and/or other events having a higher associated priority than the configuration change event. For example, a previous configuration change event may be in progress, or a failure or recovery event may be assigned a higher priority and processed prior to configuration change events.

The process next passes to step 308, which illustrates a determination of whether the configuration change event may be processed next. At a minimum, this step requires a determination of whether events for which processing had already been begun at the time the configuration change event was initiated are complete. Depending on the particular implementation, this step may also require a determination of whether the queue contains other events having a higher priority that the configuration change event, such as failure or recovery events. Thus, the process may proceed, for example, to step 309, which illustrates processing the next highest priority event, then return to step 308 to determine whether the configuration change event may be processed next. As long as the configuration change event is not the next event which may be processed, the event continues to be queued. Processing of other events which was in progress at the time the configuration change event was queued are completed before processing of the configuration change event is begun, avoiding the possibility of beginning processing of an event under one configuration and completing processing under a different configuration.

Once the configuration change event becomes the next event which may be processed, the process proceeds to step 310, which depicts backing up the current replicated configuration information. The process then passes to step 312, which depicts initiating a transaction changing the system configuration. In a preferred embodiment of the invention, the cluster software comprises a number of different components handling different aspects of providing a highly available system. The cluster software may include, for example, a component for storing configuration information, a component for detection of failures, and a component for handling failures, and/or a component for providing a user interface. Thus, processing of the transaction may require the involvement of a number of different components within the cluster software.

Because the system has been cleared from processing other events, configuration changes relevant for each of the components may be sequentially handled in a coordinated fashion. The components which will be affected by a configuration change will be determined by the nature of the desired configuration change. Each component may be modified in an ordered manner. If multiple software components are concerned with different parts of the configuration change, changes among the components may be synchronized. Such synchronization of the portions of the configuration change applied by different software components may be achieved through the use of flags associated with the replicated event queue. For example, if a new node is added to the system, changes to a topology services component of the cluster software allowing other nodes within the cluster to recognize the new node may be required first. Once this portion of the configuration change is complete on all nodes within the cluster, changes to a recovery services component of the cluster software may be required to failover certain application servers to the new node because it is now the primary processor for those applications.

Following step 310, the process passes to step 312, which illustrates beginning a transaction implementing the configuration change. The transaction may be required to change replicated configuration information, change the resources monitored, change the ownership of resources, etc. of a plurality of software components. Each software component may apply the relevant portion of the configuration change either by reinitialization or by a transition operation from the old to the new configuration. Different components may utilize different methods for applying the configuration change.

Where a component utilizes a transition operation from an old configuration to a new configuration to apply the configuration change, the changes should be logged by the cluster software coordination component. This allows the component to undo the configuration changes in the event that the configuration change transaction fails in either the component utilizing the transition operation or a different component applying a portion of the configuration change.

Referring to FIG. 3B, from step 312 the process passes to step 314, which depicts a determination of whether the transaction has failed. Failure of the transaction may occur with respect to any component. If the configuration change transaction has failed, the process proceeds to step 318, which illustrates restoring the configuration. The configuration is restored by an ordered undoing of the changes applied by any software components which have applied their portion of the configuration change, as determined from the log of the transition operation. Each component involved in the configuration change up to the point the transaction failed may, in reverse order of the configuration change transaction, restore the prior configuration applied by that component.

The synchronization requirements associated with the configuration change transaction will apply to undoing the transaction and may be similarly achieved. Depending on the method of applying a configuration change, a software component may reinitialize under the old configuration or backtrack through a logged transition operation.

Once the configuration is restored, the process proceeds to step 320, which depicts notifying the user of the failed configuration change transaction. The indication used to provide such notice may include information regarding the reason the configuration change transaction failed, including an identification of the software component in which the transaction failed. From this information, a system administrator may correct the problem and reinitiate the configuration change.

From step 320, the process proceeds to step 322, which illustrates resuming processing of events. Within this path of the process depicted, the processing of events resumes under the old configuration.

Referring again to step 314, once the transaction successfully completes, the process proceeds to step 322, described above. In this path of the process depicted, however, processing of events resumes under the new configuration.

The present invention permits configuration changes to be dynamically applied when multiple software components are required to complete the configuration change. Interference from other configuration changes is prevented, and the actions among various software components may be synchronized to apply the configuration change in an ordered manner. A copy of the old configuration is retained, and transition operations within particular components are logged. Transactions utilized to apply the configuration change are thus fail-safe, with components restoring the prior configuration in reverse order upon transaction failure either by reinitialization under the prior configuration or by reverse execution of the transition operation.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of supporting a dynamic configuration change in a cluster multiprocessing system, comprising:

enqueuing a configuration change transaction involving a plurality of software components within at least one node while the cluster multiprocessing system is running;

notifying each node within said cluster multiprocessing system of said configuration change transaction;

performing said configuration change transaction in a sequence of ordered, synchronized portions, each portion applied by a software component within said plurality of software components on each nodes within said cluster multiprocessing system before a subsequent portion is applied; and responsive to detecting that said configuration change transaction failed, restoring a prior configuration from a backup copy of the prior configuration in a reverse sequence of ordered, synchronized portions.

2. The method of claim 1, wherein said step of restoring a prior configuration further comprises:

performing said sequence of ordered portions in reverse order.

3. The method of claim 1, wherein the step of performing said configuration change transaction in a sequence of ordered portions further comprises:

synchronizing each portion within the sequence of ordered portions utilizing flags.

4. The method of claim 1, wherein the step of performing said configuration change transaction in a sequence of ordered portions further comprises:

reinitializing at least one software component within said plurality of software components with a new configuration.

5. The method of claim 1, wherein the step of performing said configuration change transaction in a sequence of ordered portions further comprises:

executing a transition operation from said prior configuration to a new configuration in at least one software component within said plurality of software components; and logging said transition operation.

6. The method of claim 1, further comprising:

creating a copy of said prior configuration; and responsive to determining that said configuration change transaction may be performed, initiating a first portion of said configuration change transaction in a software component within said plurality of software components.

7. The method of claim 1, wherein said step of restoring a prior configuration further comprises:

reinitializing at least one software component within said plurality of software components with a new configuration.

8. The method of claim 1, wherein said step of restoring a prior configuration further comprises:

rolling back a transition operation from said prior configuration to a new configuration in at least one software component within said plurality of software components.

9. An apparatus for supporting dynamic configuration changes in a cluster multiprocessing system, comprising:

transaction initiation means for enqueuing a configuration change transaction involving a plurality of software components within each node while the cluster multiprocessing system is running;

notification means for notifying each node within said cluster multiprocessing system of said configuration chance transaction;

transaction performance means for performing said configuration change transaction in a sequence of ordered, synchronized portions, each portion applied by a software component within said plurality of software components on each node within said cluster multiprocessing system before a subsequent portion is applied; and restoration means, responsive to detecting that said configuration change transaction failed, for restoring a prior configuration from a backup copy of the prior configuration in a reverse sequence of ordered, synchronized portions.

10. The apparatus of claim 9, wherein said restoration means further comprises:

means for performing said sequence of ordered portions in reverse order.

11. The apparatus of claim 9, wherein said transaction performance means further comprises:

synchronization means for synchronizing each portion within the sequence of ordered portions utilizing flags.

12. The apparatus of claim 9, wherein said transaction performance means further comprises:

means for reinitializing at least one software component within said plurality of software components with a new configuration.

13. The apparatus of claim 9, wherein said transaction performance means further comprises:

means for executing a transition operation from said prior configuration to a new configuration in at least one software component within said plurality of software components; and means for logging said transition operation.

14. The apparatus of claim 9, further comprising:

copying means for creating a copy of said prior configuration; and initiations means, responsive to determining that said configuration change transaction may be performed, for initiating a first portion of said configuration change transaction in a software component within said plurality of software components.

15. The apparatus of claim 9, wherein said restoration means further comprises:

means for reinitializing at least one software component within said plurality of software components with a new configuration.

16. The apparatus of claim 9, wherein said restoration means further comprises:

means for rolling back a transition operation from said prior configuration to a new configuration in at least one software component within said plurality of software components.

17. A computer program product for use with a data processing system, comprising:

a computer usable medium;

first instructions on said computer usable medium for for enqueuing a configuration change transaction involving a plurality of software components within each node while the cluster multiprocessing system is running;

second instructions on said computer usable medium for notifying each node within said cluster multiprocessing system of said configuration change transaction;

third instructions on said computer usable medium for performing said configuration change transaction in a sequence of ordered, synchronized portions, each portion applied by a software component within said plurality of software components on each nodes within said cluster multiprocessing system before a subsequent portion is applied; and fourth instructions on said computer usable medium, responsive to detecting that said configuration change transaction failed, for restoring a prior configuration from a backup copy of the prior configuration in a reverse sequence of ordered, synchronized portions.

18. The computer program product of claim 17, wherein said third instructions further comprise:

instructions for performing said sequence of ordered portions in reverse order.

19. A cluster multiprocessing system, comprising:

a plurality of nodes connected by at least one network, each node within said plurality of nodes including a memory containing configuration information for the cluster multiprocessing system;

cluster multiprocessing system software executing on each node, said software:

enqueuing a configuration change transaction involving a plurality of software components within at least one node while the cluster multiprocessing system is running;

performing said configuration change transaction in a sequence of ordered, synchronized portions, each portion applied by a software component within said plurality of software components on each nodes within said cluster multiprocessing system before a subsequent portion is applied; and responsive to detecting that said configuration change transaction failed, restoring a prior configuration from a backup copy of the prior configuration in a reverse sequence of ordered, synchronized portions.

20. The cluster multiprocessing system of claim 19, said cluster multiprocessing software performing said configuration change transaction in a sequence of ordered portions, each portion applied by a software component with said plurality of software components.

* * * * *